United States Patent [19]

Takada

[11] 4,060,211
[45] Nov. 29, 1977

[54] RETRACTION LOCKING SAFETY BELT RETRACTOR

[75] Inventor: Juichiro Takada, Shin, Japan

[73] Assignee: Takata Kojyo Co., Ltd., Tokyo, Japan

[21] Appl. No.: 678,510

[22] Filed: Apr. 19, 1976

[30] Foreign Application Priority Data

Apr. 22, 1975 Japan .................................. 50-048212

[51] Int. Cl.$^2$ ........................ A62B 35/00; B65H 75/48
[52] U.S. Cl. ................................................. 242/107.7
[58] Field of Search ................... 242/107.4 R–107.4 E, 242/107.6, 107.7

[56] References Cited

U.S. PATENT DOCUMENTS

| | | | |
|---|---|---|---|
| 3,491,966 | 1/1970 | Curran et al. | 242/107.6 X |
| 3,635,420 | 1/1972 | Romanzi | 242/107.4 D |
| 3,834,646 | 9/1974 | Heath | 242/107.7 |
| 3,851,836 | 12/1974 | Sprecher | 242/107.7 |
| 3,858,826 | 1/1975 | Sprecher | 242/107.7 |
| 3,869,098 | 3/1975 | Sprecher | 242/107.6 X |

*Primary Examiner*—Stanley N. Gilreath
*Assistant Examiner*—John M. Jillions
*Attorney, Agent, or Firm*—Wolder & Gross

[57] ABSTRACT

A safety belt retractor reel which is automatically locked against belt extraction under emergency conditions or with the withdrawal of a predetermined length of belt is provided with a mechanism for releasing and locking the reel against belt retraction operated in response to respective successive short sequential extraction and retraction of the belt. The mechanism includes a supplementary ratchet wheel affixed to the reel shaft and a pawl spring biased into engagement with the ratchet wheel to lock the reel against belt retraction. A pair of first and second cam discs are rotatably supported by the shaft and individually slip drive coupled thereto. One of the cam discs functions to releasably retain the pawl in its ratchet disengage position and the other cam disc functions to urge the pawl toward the retainer disc against its spring bias with the belt extraction rotation of the reel. Transfer of the pawl from either its ratchet engage or disengage position to its opposite position is effected by a predetermined extraction of the belt followed by retraction thereof.

5 Claims, 6 Drawing Figures

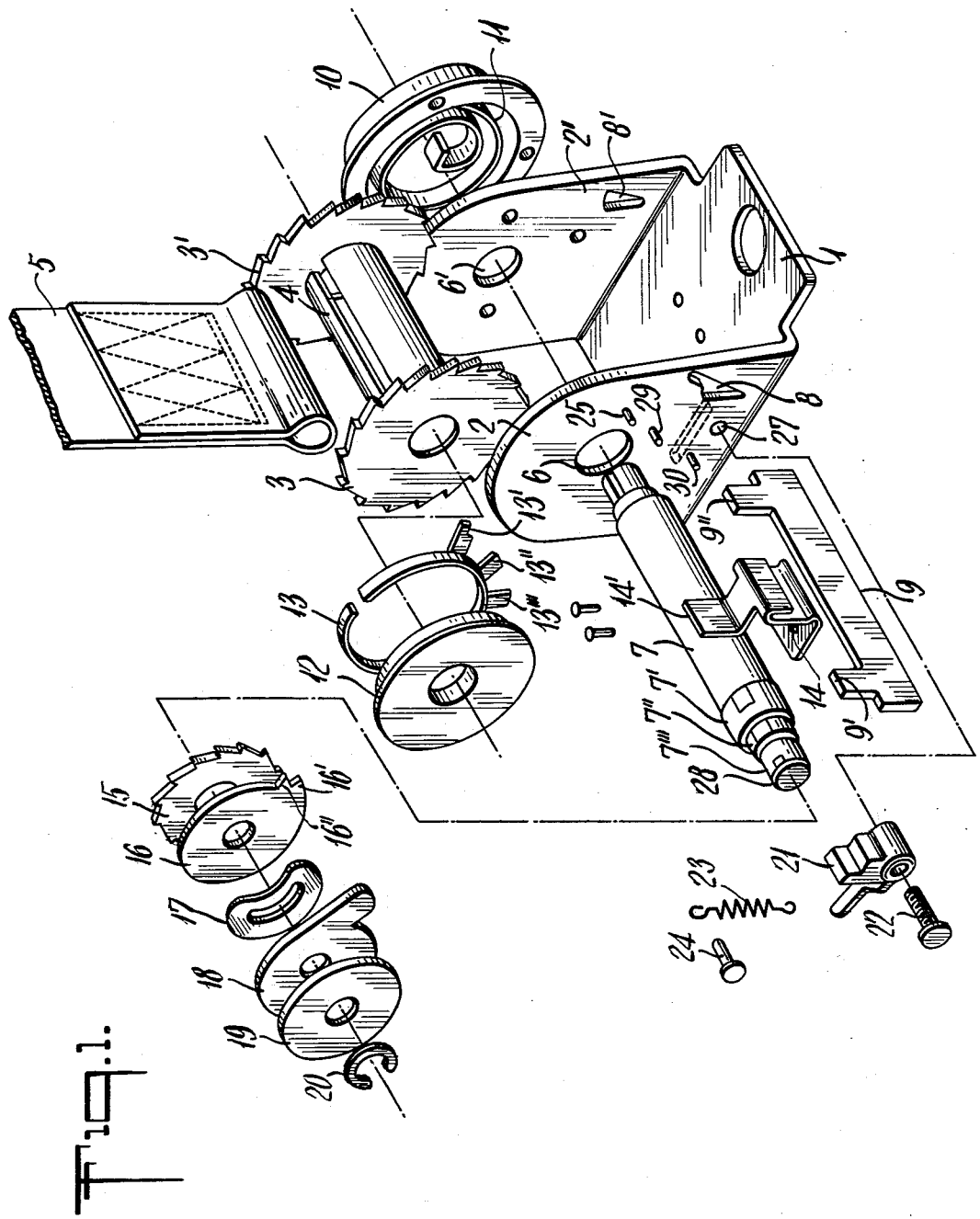

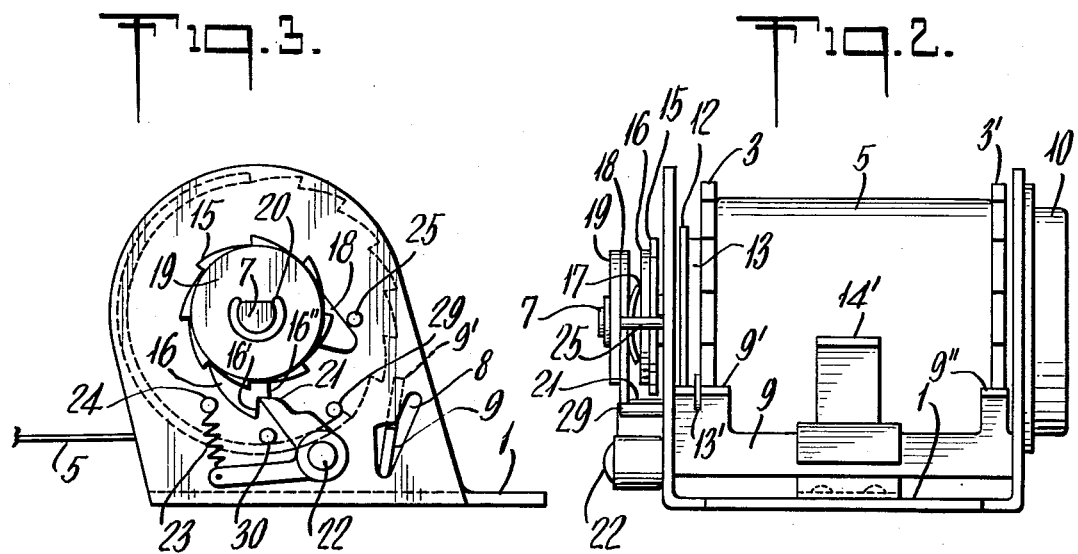
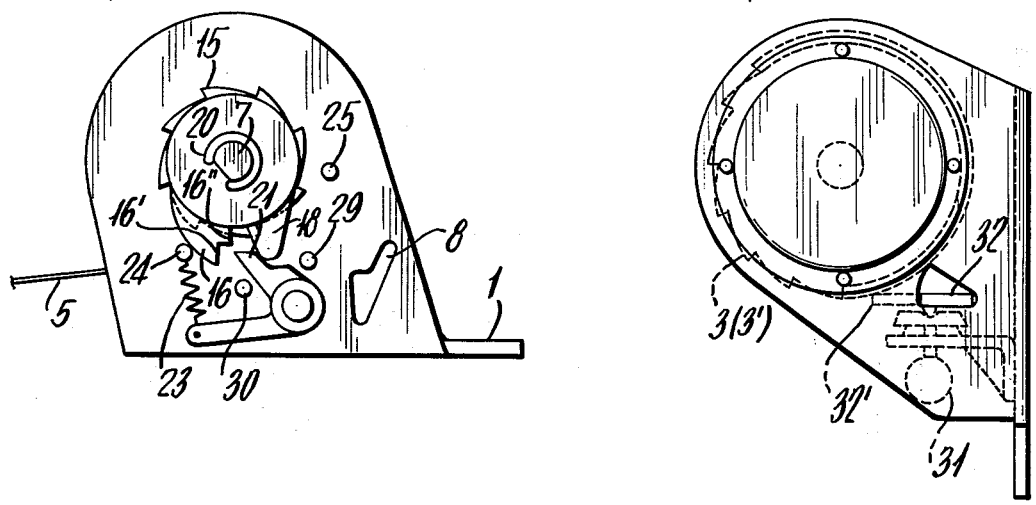
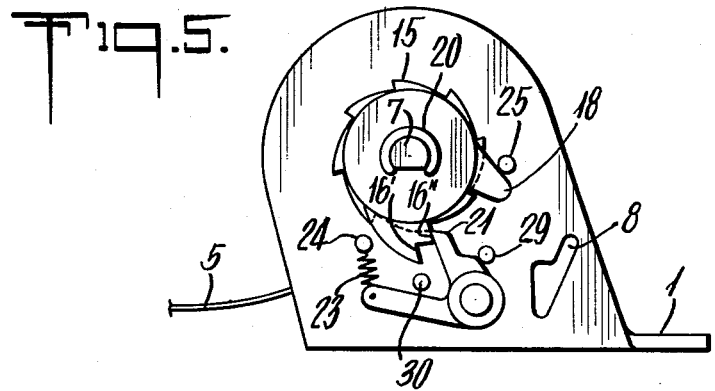

RETRACTION LOCKING SAFETY BELT RETRACTOR

BACKGROUND OF THE INVENTION

The present invention relates generally to improvements in vehicle safety belt retraction reels and it relates more particularly to an improved safety belt retraction reel of the automatic or emergency locking type provided with a mechanism for releasably locking the reel against belt retraction.

As an effective means for minimizing fatalities or injuries to vehicle passengers in the event of accident, safety belts are installed in almost all of the vehicles of recent manufacture, but the percentage of the passengers wearing such safety belt is far from satisfactory. To encourage the motorist and other vehicle passengers to wear the safety belt, various arrangements and devices have been proposed for improving or simplifying the procedures in handling the belt. Among such proposals are a belt retracting winding device, an automatically locking retracting device which obviates any belt length adjustment when wearing the belt, and an emergency locking winding device which permits free movement of the wearer except at the time of an emergency. However, these devices have the defect that a sense of oppression is imparted to the abdomen or shoulder of the belt wearer as the belt winding force is always acting on the wearer, and hence it has been an important object for encouraging the wear of the safety belt to eliminate such sense of oppression from the belt wearer.

SUMMARY OF THE INVENTION

It is accordingly a principal object of the present invention to provide an improved vehicle safety belt retractor device.

Another object of the present invention is to provide an improved safety belt retractor reel in which the belt take-up reel is selectively locked against belt retraction or released.

Still another object of the present invention is to provide in a safety belt retractor reel which is automatically locked against belt extraction in response to emergency conditions or upon withdrawal of a predetermined length of belt an improved belt controlled mechanism for selectively releasing and locking the reel against belt retraction.

A further object of the present invention is to provide a device of the above nature characterized by its simplicity, reliability, ruggedness, low cost, ease of operation and great versatility and adaptability.

The above and other objects of the present invention will become apparent from a reading of the following description taken in conjunction with the accompanying drawings which illustrate preferred embodiments thereof.

In accordance with the present invention there is provided an automatically locking type or emergency locking type safety belt retracting device which is capable of eliminating the sense of oppression imparted to the wearer when wearing the safety belt, by a simple mechanism in which a ratchet wheel and two cam-formed discs are mounted on a winding shaft and a pawl is biased by a spring toward engagement with the ratchet wheel and cam-formed discs, the components being mounted on a frame member whereby said pawl and ratchet wheel are engaged with the extraction of a small length of the belt effected by a slight pull thereof, so as to inhibit the belt winding movement to thereby eliminate the sense of oppression to the belt wearer.

The improved device is reliable, rugged, simple, of low cost, easy to operate and highly versatile and adaptable.

BRIEF DESCRIPTION OF THE DRAWINGS

FIG. 1 is an exploded perspective view of a preferred embodiment of the present invention;

FIG. 2 is an end elevational view thereof;

FIG. 3 is a side elevational view thereof shown in the reel retraction release position;

FIG. 4 is a view similar to FIG. 3 shown during the reel locking transfer cycle;

FIG. 5 is a view similar to FIG. 3 but showing the reel locked against belt retraction; and FIG. 6 is a side elevational view of another embodiment of the present invention.

DESCRIPTION OF THE PREFERRED EMBODIMENTS

Referring now to the drawings which illustrate preferred embodiments of the present invention, reference numeral 1 generally designates a U-shaped frame or bracket which functions as a body portion or mount of the improved safety belt retracting device and which is secured to the vehicle floor or a side wall of the seat or the center pillar or roof and other suitable place by bolts or other fastening means. Between the side plates 2, 2' of the frame 1 is disposed a reel 4 which carries at both its opposite ends a pair of ratchet wheels 3, 3' and on which reel is wound a safety belt 5 with one end thereof suitably fixed to the reel. The reel 4 is supported on and rotatable with a shaft 7 journalled in axially aligned holes 6, 6' formed in the frame side plates 2, 2'.

A pawl 9 extends between the frame side plates 2, 2' in close proximity to ratchet wheels 3, 3' with both ends of pawl 9 being swingably supported in fan-shaped holes 8, 8' formed in the frame side plates. The pawl 9 is swingable in the fan-shaped holes 8, 8' in such a way that the pawl element defining end protuberances 9', 9" formed on pawl 9 will be engaged with or separated from the ratchet wheels 3, 3' by the action of a mechanism to be hereinafter described. On one end of the shaft 7 projecting outwardly of the frame side plate 2', is mounted a spiral coil spring 11 housed in an enclosure cap 10 which spring functions to retract and wind up the safety belt 5 on reel 4.

Between the reel ratchet wheel 3 and frame side plate 2 is disposed a flanged wheel 12 fitted and fixed to a cut-out portion 7' in a radially enlarged section of the shaft 7, the flanged wheel 12 being associated with a split ring resilient clutch 13 which encircle and is fitted on the body portion thereof. The clutch 13 is provided with radially outwardly projecting arms 13', 13" which are engagable with the pawl end protuberance 9', and a stop 13'" which engages an elongated limit slot (shown by dotted line) formed in the bottom or cross web of the frame 1, whereby when the shaft 7 rotates, said clutch 13, while sliding on the flanged wheel 12 is urged to turn with its movement being limited within the range of the slot in the frame 1 by the action of the stop 13''', while the end protuberances 9', 9" of the pawl 9 are engaged with or separated from the ratchet wheels 3, 3' by the arms 13', 13" respectively of the clutch 13.

The pawl 9 is always under a bias force tending in the direction of ratchet wheels 3, 3' by a pawl spring 14 which is secured to the frame bottom wall by rivets or other fastening means and which is provided with a feeler 14' which bears on and functions to sense the diameter of the wound-up belt roll, so that when the belt is extracted a certain length, the pawl 9 is operated by the action of the feeler 14' and arms 13', 13" of the clutch 13 to permit the protuberances of pawl elements 9', 9" of the pawl 9 to engage with the respective ratchet wheels 3, 3' to inhibit draw-out of the belt.

A detailed description of the structure and operation of the mechanism including elements 9, 12, 13 and 14 may be found in copending U.S. application Ser. No. 669,355 filed Mar. 22, 1976. As embodied in an automatically locking type retracting device having the above described mechanism or as an emergency locking type retracting device incorporating a locking mechanism such as shown in FIG. 6 where in the event of an emergency such as when an impact exceeding a certain acceleration is imparted to the vehicle body, a pawl 32 is operated by a pendulum 31 or like means to cause the pawl element or end 32' of the pawl 32 to engage with the ratchet wheel 3, 3' to thereby inhibit withdrawal of the belt, the improved device is featured by the following mechanism.

A ratchet wheel 15 is fitted to and fixed on a cut-out or stepped down portion 7" at an end of the shaft 7 projecting outwardly from the frame side plate 2 and a disc 19 is fixed in a cut-out portion in a radially reduced outer section 7''' of the shaft. Also, on the reduced section 7''' of the shaft 7 are rotatably mounted a retainer or locking disc 16 formed with a stepped or double lift peripheral cam edge adjacent to the ratchet wheel 15 and a shifting disc 18 with a single lift cam or arm adjacent to the disc 19, and a wave formed or undulate clutch spring 17 is loosely fitted between the cam discs 16 and 18, in such a way that the disc 16 is in slidable frictional engagement with the ratchet wheel 15 and the disc 18 is in slidable frictional engagement with the disc 19 by and under the influence of the repulsion of the clutch spring 17. In a slit 18 formed at the outer end of the shaft portion 7''' and outside of the disc 19 is secured an E-ring 20 for locking the disc and cam assembly from separating from the shaft. Projecting outwardly from the side plate 2 of the frame 1 are stop pins 25, 24 for limiting the angle of rotation of disc 18 and disc 16 respectively, and a wide pawl 21 always imparted a bias force by a spring 23 in a direction to engage with the discs 18, 16 and wide pawl 21 is also swingably secured to the side plate 2 by a pivot pin 22. The range of movement of pawl 21 is restricted to the distance between the limit or stop pins 29 and 30 also projecting from the side plate 2 of the frame 1.

The operation of the improved safety belt retractor device having the above described mechanism is hereinafter explained.

In the conventional automatically locking or emergency locking type belt retractor devices using a coil or tension spring to accumulate the belt winding or retracting force, when the belt is extracted or withdrawn out, the spring belt retraction force is increased and such retraction force imparts a sense of oppression to the passenger when he wears the belt. Particularly in the automatically locking type retracting devices, the safety belt is locked against extraction when the belt is worn, so that if a passenger body is moved by any sharp movement of the vehicle or by other causes and the belt is accordingly loosened, the belt is additionally retracted and locked in condition with the passenger being very tightly clinched, and each time this occurance is repeated, the passenger body is more tightly clamped to the seat.

According to the device of the present invention however, any additional wind-up of the belt is inhibited by the simple expedient of only slightly pulling the belt after wearing it, and hence no sense of oppression is felt by the passenger wearing the belt.

Referring to FIG. 3, there is shown the condition of the improved mechanism according to the present invention in which the belt 5 has been wound up and retracted on the retractor reel. While the belt is retracted and wound, the disc 16 with the double lift cam and the disc 18 with the single lift cam rotatably slide on the shaft 7, and slide along the ratchet wheel 15 and disc 19, which rotate with the shaft, both discs 16 and 18 turning counterclockwise with the retraction winding rotation of the shaft 7, the disc 18 being stopped upon engaging the stop pin 25 and the disc 16 being stopped as the pawl 21 engages with the first stage cam portion 16' to turn the pawl 21 until it engages the stop pin 29. Howver, the winding shaft 7 continues to rotate by overcoming the friction force developed between the disc 19 and disc 18 and the friction force developed between the ratchet wheel 15 and disc 16 until the belt is completely wound upon the reel 4. Then, when the belt 5 is extracted attendant to the application thereof, the disc with the double lift cam 16 and the disc with the single lift cam 18 are turned clockwise as viewed in FIG. 4 whereby the pawl 21 is freed from engagement with the first-stage cam portion of the disc 16 and turned by the arm of disc 18 to the position in engagement with the pin 30. Thereafter, when the belt is buckled or worn, any slackness of the belt 5 is retracted and wound back to fit the passenger's body and both discs 18 and 16 are urged to turn counterclockwise with the rotation of the shaft 7, and the pawl 21 is swung in engagement with the arm of the disc 18 under the influence of the bias force of the spring 23. Consequently, the first-stage cam portion 16' of the disc 16 engages the pawl 21 to push the latter to the position of the pin 29 to stop the disc 16, while the disc 18 turns to the position of the pin 25 and stops there. This condition is the same as when the belt has been initially retracted as shown in FIG. 3, and the belt is free to move in either direction, extraction or retraction.

When the belt is buckled to the passenger's body, if the belt is then slightly pulled out or extracted (by a length slightly longer than the distance from the first-state cam portion 16' to the second-stage cam portion 16" of the disc 16), the disc 16 is slightly turned clockwise to release the pawl 21 from the first-stage cam portion 16', pawl 21 swings to engage the second-stage cam portion 16", and under this condition, if the belt is loosened, the ratchet wheel 15 turns counterclockwise and one of its teeth is engaged by the pawl 21 (see FIG. 5) to stop any retraction rotation of the winding shaft 7, thereby inhibiting further retraction of the belt 5. When it is desired to release this locked condition for fully retracting and returning the belt to its non-use wound position, the belt wearer first slightly extracts or pulls the belt 5, whereby the discs 18, 16 and ratchet wheel 15 turn clockwise to separate the pawl 21 from the disc 16 (FIG. 4) and to be further turned by the disc 18 to separate even further from the outer periphery of the shaft ratchet wheel 15, and then, following the stopping of the pulling of the belt, the wearer slightly loosens the belt, whereby, as described before in connection with the belt wearing operation, the pawl 21 engages the first stage cam portion 16' of the disc 16 to allow the belt 5 to be freely reeled as shown in FIG. 3.

While the present invention has been described by specific examples as applied to the automatically locking type and emergency locking type systems, these are merely illustrative and should be interpreted as not limiting the scope of the present invention.

As described above, in the conventional safety belt equipment employing an automatically locking type or emergency locking type belt retracting device designed to accumulate the belt retraction or winding force on the belt winding shaft, it was unavoidable to always impart a sense of oppression to the shoulder and/or the waist of the belt wearer, and the solution of this problem has been a long felt need, but there have been available few device which are commercially acceptable, most of these devices being complicated in structure, high in manufacturing costs and possessing other disadvanages. The device of the present invention eliminates such sense of oppression to the belt wearer by merely incorporating a very simple mechanism and, in operation, by only slightly pulling the belt when wearing the belt, without the least sacrificing the locking performance of the winding device, and it therefore promotes and encourages the wearing of the safety belt.

While there have been described and illustrated a preferred embodiment of the present invention, it is apparent that numerous alterations, omissions and additions may be made without departing from the spirit thereof.

I claim:

1. A belt retractor device comprising a U-shaped mounting bracket, a shaft rotatably supported by said bracket, a reel mounted on said shaft and rotatable therewith in opposite belt retraction and extraction directions, a belt coupled to said reel and windable thereon with the belt retraction rotation thereof, spring means biasing said reel and shaft in a belt retraction direction, first braking means for braking said reel against rotation in a belt retraction direction and transferrable between braking and release positions and actuating means responsive to the successive extraction and retraction rotation of said reel for alternatively positioning said first braking means in said braking or release positions, said device being characterized in that said first braking and actuating means comprise a ratchet wheel rotatable with said shaft, a pawl pivotally mounted on said bracket and movable between ratchet wheel engage and disengage positions to respectively brake and release said reel, spring means urging said pawl toward a ratchet wheel engage position, a first driven member slip drive coupled to said reel and rotatable a predetermined angle and having a lock portion adapted to releasably lock said pawl in its ratchet wheel disengage position, a second driven member slip coupled to said reel and rotatable a predetermined angle to swing said pawl toward said first drive member with the belt extraction rotation of said reel, a drive disc coaxially affixed to said shaft, said first and second driven members comprising disc members coaxially located on said shaft and rotatable relative thereto between said ratchet wheel and said drive disc and spring means urging each of said driven disc members into frictional drive engagement with said drive disc and ratchet wheel respectively.

2. The belt retractor device of claim 1 comprising second braking means for releasably braking said reel against belt extraction rotation in response to the rotation of said reel to a predetermined amount of belt extraction followed by the belt retraction rotation of said reel.

3. The belt retractor device of claim 1 comprising second braking means for releasably braking said reel against belt extraction and means responsive to a predetermined sensed change in velocity or direction for actuating said second braking means.

4. The belt retractor device of claim 1 wherein said lock portion comprises a stepped outward projection formed on said first driven disc member for engaging said pawl and releasably locking it in its ratchet wheel disengage position.

5. The belt retractor device of claim 1 wherein said second driven disc member includes an outwardly projecting arm movable into engagement with said pawl with the belt extraction rotation thereof to urge said pawl toward said first driven disc member.

* * * * *